United States Patent
Johnson

(10) Patent No.: US 9,555,739 B1
(45) Date of Patent: Jan. 31, 2017

(54) VEHICLE SAFETY BELT BYPASS WARNING SYSTEM

(71) Applicant: INTERNATIONAL BUSINESS MACHINES CORPORATION, Armonk, NY (US)

(72) Inventor: Randy S. Johnson, O'Fallon, MO (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/174,048

(22) Filed: Jun. 6, 2016

Related U.S. Application Data

(63) Continuation of application No. 14/994,715, filed on Jan. 13, 2016, now Pat. No. 9,415,746.

(51) Int. Cl.
*B60R 22/00* (2006.01)
*B60R 21/00* (2006.01)
*B60Q 9/00* (2006.01)
*B60R 22/48* (2006.01)
*B60R 22/34* (2006.01)
*G06K 9/00* (2006.01)

(52) U.S. Cl.
CPC ............... *B60Q 9/00* (2013.01); *B60R 22/34* (2013.01); *B60R 22/48* (2013.01); *G06K 9/00288* (2013.01); *G06K 9/00838* (2013.01); *B60R 2022/4816* (2013.01); *B60R 2022/4858* (2013.01); *B60R 2022/4866* (2013.01)

(58) Field of Classification Search
CPC ............... B60R 2022/4858; B60R 2022/4866; B60R 2022/485; B60R 2022/4808; B60R 2022/48

USPC .... 180/268; 280/801.1; 340/457.1; 382/100; 701/45

See application file for complete search history.

(56) References Cited

U.S. PATENT DOCUMENTS

| 5,906,393 A | 5/1999 | Mazur et al. |
| 6,439,333 B2 | 8/2002 | Domens et al. |
| 7,370,883 B2 * | 5/2008 | Basir ................. B60R 21/01532 280/735 |

(Continued)

FOREIGN PATENT DOCUMENTS

EP 2937251 A1 10/2015

OTHER PUBLICATIONS

Catenary—http://en.wikipedia.org/wiki/Catenary, pp. 1-20 (2016).

(Continued)

*Primary Examiner* — Toan To
(74) *Attorney, Agent, or Firm* — Weitzman Law Offices LLC

(57) ABSTRACT

A vehicle safety belt bypass warning system involves, a video camera, at least one processor, face detection software, a safety belt, and a safety belt engagement sensor circuit. The processor detects that a human face is present and associated with an individual seat. An infrared (IR) emitter output is positioned on the safety belt and transmits individually coded light pulses unique to the occupied seat. At least one IR receiver receives individually coded light pulses from occupied seat IR emitters and, in response, will output coded electrical signals indicative of which occupied seat(s) the individually coded light pulses were received from. The at least one processor will wait for receipt of the coded electrical signals from the IR receiver. If the processor does not receive an indication for a particular occupied seat, the processor will trigger a safety belt bypass warning indicator.

1 Claim, 4 Drawing Sheets

(56) References Cited

U.S. PATENT DOCUMENTS

| | | | |
|---|---|---|---|
| 7,620,521 B2* | 11/2009 | Breed | B60N 2/002 |
| | | | 177/1 |
| 7,812,716 B1 | 10/2010 | Cotter | |
| 8,116,528 B2* | 2/2012 | Allen | B60Q 3/008 |
| | | | 382/104 |
| 8,195,356 B2* | 6/2012 | Allen | G01M 17/00 |
| | | | 701/29.8 |
| 9,073,506 B2* | 7/2015 | Baur | B60N 2/688 |
| 2005/0156726 A1* | 7/2005 | Rubel | B60R 22/48 |
| | | | 340/457.1 |
| 2006/0282201 A1 | 12/2006 | Kong et al. | |
| 2007/0055427 A1 | 3/2007 | Sun et al. | |
| 2007/0195990 A1 | 8/2007 | Levy | |
| 2007/0285218 A1 | 12/2007 | Fletcher et al. | |
| 2008/0042408 A1 | 2/2008 | Breed et al. | |
| 2009/0121859 A1 | 5/2009 | McCoy | |
| 2009/0234542 A1 | 9/2009 | Orlewski | |

OTHER PUBLICATIONS

Karthik et al., "Design and Development of Seat Belt Alert System with Ignition Interlocking in Four Wheeler," International Journal of Scientific and Research Publications, vol. 4, Issue 7, Jul. 2014.

\* cited by examiner

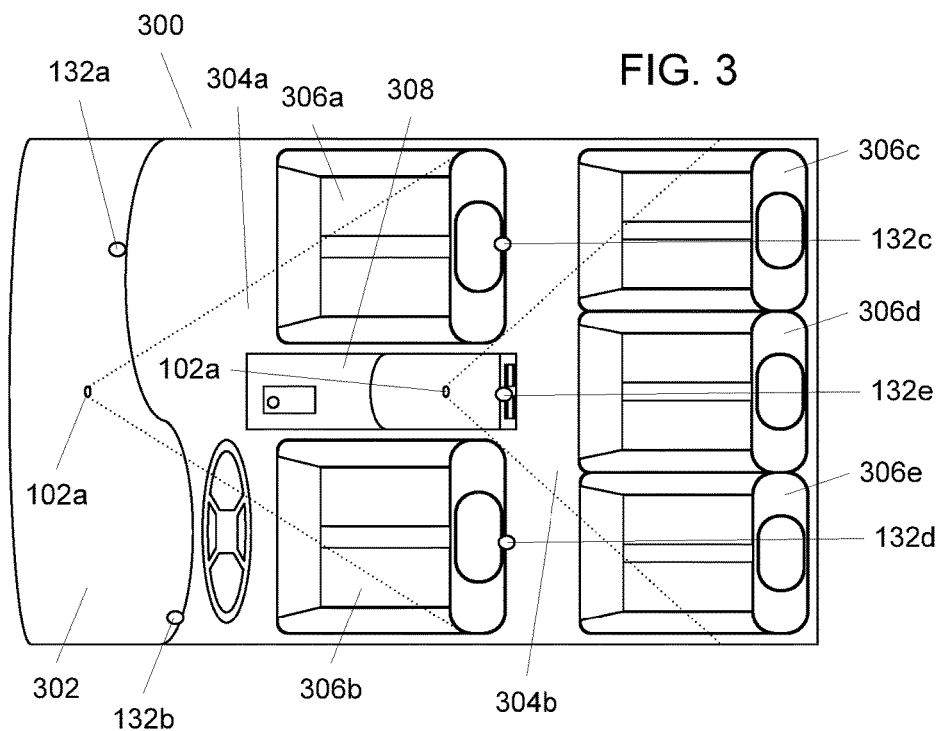
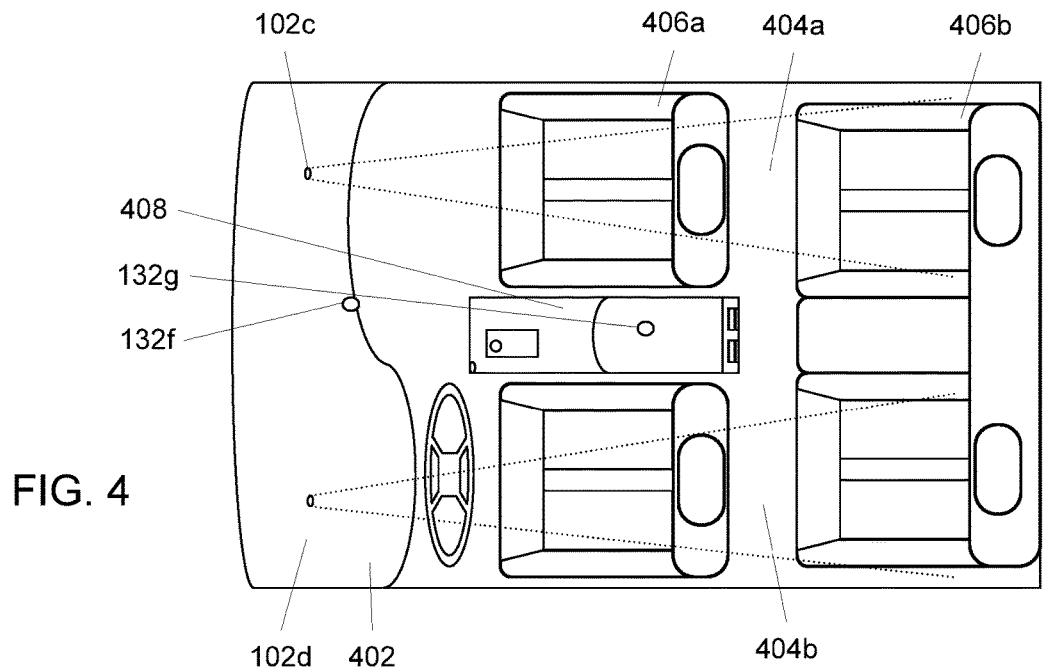

FIG. 5
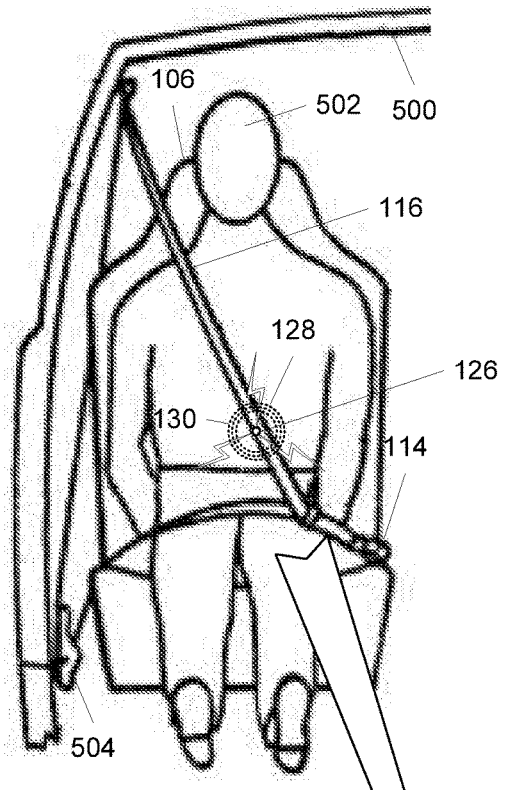
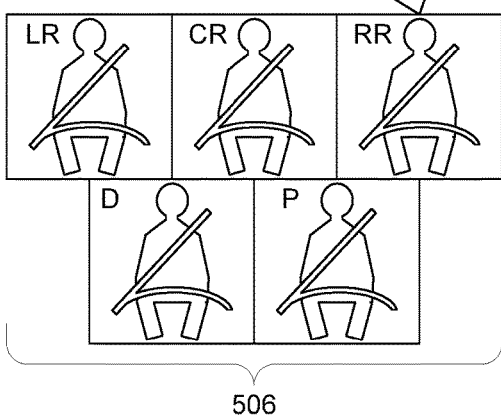
FIG. 6
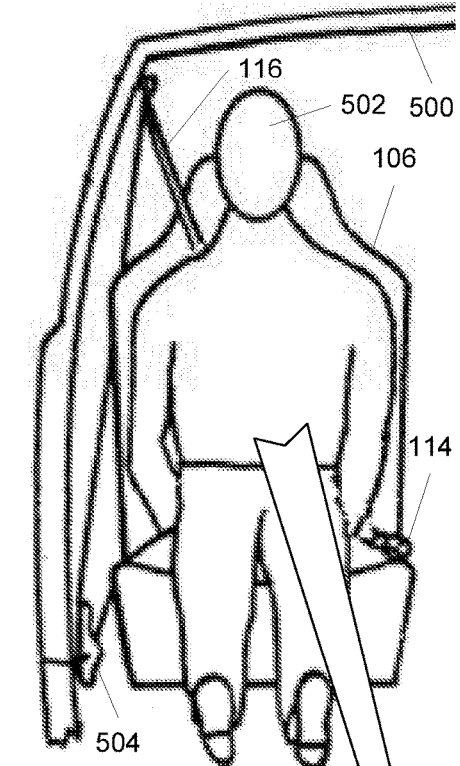
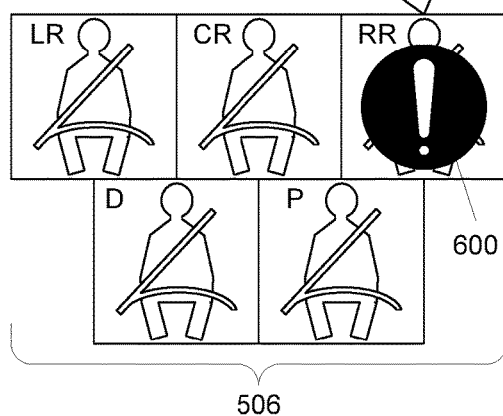

VEHICLE SAFETY BELT BYPASS WARNING SYSTEM

CROSS REFERENCE TO RELATED APPLICATIONS

This application is a continuation of U.S. patent application Ser. No. 14/994,715 the entirety of which is incorporated herein by reference.

FIELD OF THE INVENTION

This disclosure relates to vehicles and, more particularly, vehicle safety belts.

BACKGROUND

It is indisputable that safety belt usage in vehicles saves lives. The changeover from simple lap belts to "three point" safety belts, made up of both a lap belt and a belt that extended from the shoulder across the torso to the lap further improved vehicle safety. Nevertheless, despite general availability of three point safety belts as standard equipment in vehicles for more than thirty years, some people continue to avoid their use.

Another annoyance is the fact that most current automobiles all now include some form or circuit to detect and warn when at least a certain amount of weight is in a vehicle seat and the safety belt is not latched.

In an effort to avoid safety belt usage, some people bypass this warning system by latching the safety belt before sitting down and then sitting on the belt, or, at the very least, by engaging the safety belt properly, but then moving the torso restraint portion of the safety belt behind them, largely defeating their ability to protect the person if necessary.

However, such warning systems can become annoying even for those who always use their safety belts because heavy objects, such as pets, large bags of groceries, or other objects, on a vehicle seat can trigger the warning system, even though the seat is not occupied by a person.

SUMMARY

One aspect of this disclosure involves a vehicle safety belt bypass warning system for a vehicle having an ignition system and at least two seats within the vehicle. The vehicle safety belt bypass warning system includes a video camera having a field of view and each of the at least two seats is within the field of view. At least one processor is within the vehicle. Face detection software, executable by the at least one processor, enables the processor to recognize, for each of the at least two seats, human faces, and a dashboard warning indication unit is within the vehicle, having at least two safety belt bypass warning indicators each corresponding to one of the at least two seats.

Each of the seats has associated therewith a safety belt, extendable from a retracted position to a second position and retractable from the second position to the retracted position, and a safety belt engagement sensor circuit that detects when a safety belt latch plate of the safety belt, is received in and latched by a corresponding safety belt latch plate receiver. A seat occupation sensor senses when at least a minimum weight is on the seat.

An individual seat of the at least two seats is considered an occupied seat when the seat occupation sensor senses at least the minimum weight, the safety belt engagement sensor circuit detects that the safety belt is latched, and the processor detects that a human face is present and associated with the individual seat.

The vehicle safety belt bypass warning system also includes an infrared (IR) emitter coupled to an IR emitter output positioned on the safety belt, that is enabled after the ignition system has been engaged based upon at least one of a) a repetition schedule, or b) occurrence of some event while the engine is running and the vehicle is in gear. If the seat is occupied, once enabled by the at least one processor, it will transmit individually coded light pulses, unique to the occupied seat, for a period of time.

At least one IR receiver is also within the vehicle, and is enabled when at least one IR emitter output is enabled. It is positioned to receive individually coded light pulses from occupied seat IR emitters during the period of time and, in response to receipt, will output one or more coded electrical signals indicative of which of each occupied seat that the individually coded light pulses were received from.

The at least one processor is coupled to the at least one IR receiver, and will wait for receipt of one or more coded electrical signals output from the IR receiver during the time period, the one or more coded electrical signals specifically indicating each seat that has a non-bypassed safety belt. If the processor does not receive an indication for a particular occupied seat, the processor will trigger a safety belt bypass warning indicator of the dashboard warning indication unit to indicate that the particular occupied seat has a bypassed safety belt.

In this manner, bypass attempts are detected and false warnings triggered by other than a human weight in a seat are avoided.

The foregoing and following outlines rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which:

FIG. 3 illustrates, in simplified form, an overhead view of a vehicle interior showing one example placement for video camera(s) and IR receiver(s) as described herein;

FIG. 4 illustrates, in simplified form, an overhead view of a vehicle interior showing another alternative example placement for video camera(s) and IR receiver(s) as described herein; and FIGS. 5-6 collectively illustrate, in simplified form, one example of safety belt bypass warning indication.

DETAILED DESCRIPTION

This disclosure provides a technical solution to address the aforementioned problems inherent with safety belt warning systems.

Figure 1:
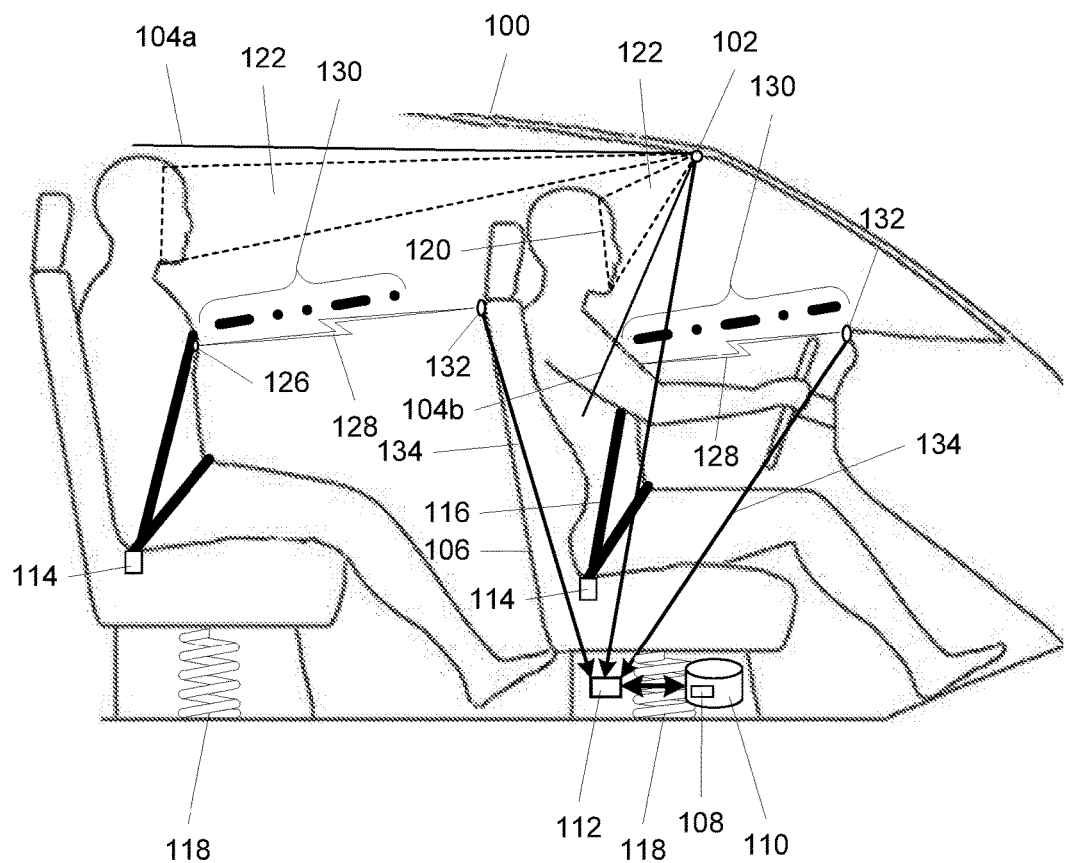
FIG. 1 illustrates, a simplified cutaway view of a portion of the interior of a vehicle incorporating one example implementation of a safety belt bypass warning system as described herein.

FIG. 1 illustrates, a simplified cutaway view of a portion of the interior of a vehicle 100 incorporating one example implementation of a safety belt bypass warning system as described herein.

As shown in FIG. 1, the system includes at least one video camera 102 located within the vehicle, for example, in the dashboard, binnacle, headliner, windshield frame, center console, etc. such that it has a field of view (between by the extreme lines 104a, 104b) encompassing the upper portion of at least two seats 106 within the vehicle 100.

The system further includes, a face detection software 108 program, stored within storage 110, that is accessible to, and executable by, a processor 112 located within the vehicle 100 that, as described below, will enable the processor to receive output from the video camera 102 and recognize whether a human face is present and associated with either or both of the at least two seats 106. At this point it should be noted that the storage 110 stores format defining data structures, data-containing structures, and program instructions, for example, the face detection software 108 program, among others that enable the processor 112 to operate as described herein, in a non-transitory manner, for example, such as non-transient solid state memory, a magnetic hard drive, a CD or DVD, a tape drive, or an analogous or equivalent storage medium type would.

The vehicle 100 is equipped with a conventional retractable safety belt 116 for each seat 106 (i.e., it can be extended from a retracted position, for example, near the B-pillar, C-pillar, or upper portion of the seat back, to another position and returned to the retracted position). Thus, each of the seats has associated with it, a conventional safety belt engagement sensor circuit 114 that detects when a conventional safety belt 116 is latched (i.e., the latch plate of a safety belt is received in, and latched by, a corresponding latch plate receiver). Each seat 106 also has an associated seat occupation sensor 118 that senses when at least a minimum amount of weight is on the seat.

Figure 2:
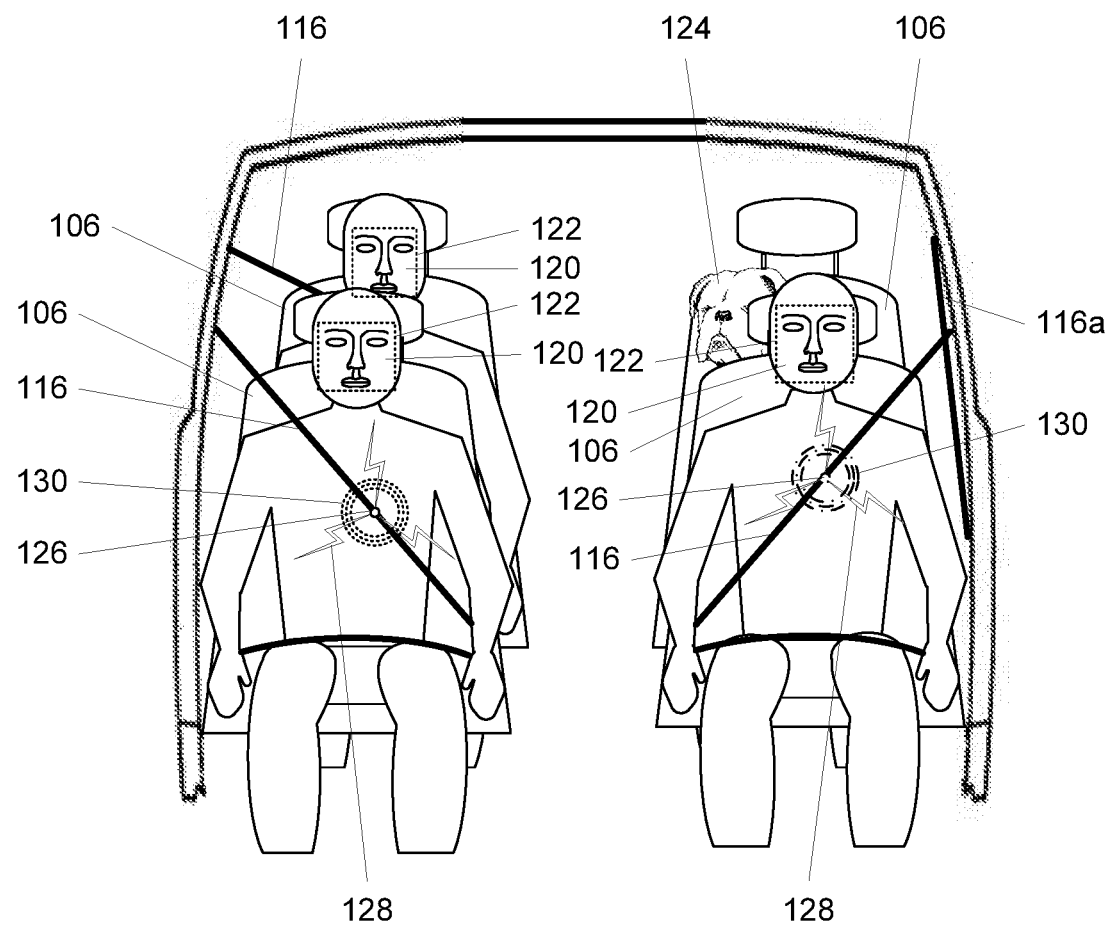
FIG. 2 illustrates, in simplified form, a cutaway view of a vehicle, viewed from the front of the vehicle.

FIG. 2 illustrates, in simplified form, a cutaway view of a vehicle 100, viewed from the front of the vehicle 100. As shown in FIG. 2, the vehicle has four occupants.

As noted above, with conventional safety belt warning systems, the mere use of conventional safety belt engagement sensor circuit 114 and seat occupation sensor 118 routinely cause false, and annoying, warnings when, for example, bags of groceries, a large dog, or other objects having a weight about equivalent to the weight of a small child are on a seat.

Advantageously, such false warnings are avoided using a system as described herein through use of the video camera 102 and face detection software 108 to determine when a seat is to be considered "occupied" for with implementations of the safety belt bypass warning system as described herein.

Referring now to FIG. 1 and FIG. 2 in combination, the processor 112 running the face detection software 108 searches for faces in the vehicle within the field of view boundaries 104a, 104b of the video camera 102. The face detection software 108 program is a computer program that can detect a human face and differentiate it from the face of, for example, a dog. The program is implemented as a less sophisticated version of facial recognition software because it need only recognize the existence of a human face, as opposed to being able to discern human features at a resolution sufficient to match them with other images to detect the same person.

As shown, using this approach, human faces 120 have been detected for three of the seats 106 within parts 122 of the field of view. In contrast, despite a heavy dog 124 being present behind the driver 126, since the face detection software 108 did not detect a human face, only the driver's seat, front passenger seat and rear seat behind the front passenger seat are each considered an "occupied seat" for purposes of the safety belt bypass warning system as described herein.

In addition, the safety belt 116 for each seat 106 also includes an output 126 of an infrared (IR) emitter. One example of a suitable IR emitter is the SFH 4710 OSLON Compact emitter commercially available from OSRAM Opto Semiconductors GmbH, Leibnizstraße 4, D-93055 Regensburg, Germany. Other IR emitters may be used as well, the important aspect being the ability to provide the IR emitter directly on the safety belt, or couple it to an optical fiber that has its output end on the safety belt, not the specific device used to do so.

Depending upon the particular implementation, the output 126 may actually be on an individual IR emitter, or it may be the end of an optical fiber light pipe that is coupled to an IR emitter located somewhere else in the vehicle 100, for example, near the retractor reel for the safety belt 116. Ideally, the output 126 is located such that it is either covered or disabled when the safety belt is retracted. For simplicity, both configurations are interchangeably referred to herein as an "IR emitter output" 126.

The IR emitter output is operated such that, if the seat 106 is an occupied seat, the output 126 for its associated safety belt 116 is enabled some time after the ignition system of the vehicle is engaged. Depending upon the implementation, the enablement may be immediate or, more likely, it will be delayed for some period of time to allow time for people who latch their safety belts after the vehicle 100 is running. Alternatively, it can be delayed until the transmission is moved out of "Park" or, in the case of a manual transmission, the clutch is depressed and gear shift lever is moved into gear.

Once an IR emitter output 126 is enabled for an occupied seat, it will emit IR light pulses 128 uniquely coded 130 to identify that individual seat. Depending upon the particular implementation, the enablement period can be a single short time period following engagement of the ignition system, it can be enabled on an asynchronous changing schedule, or as a regularly repeating process, for as long as the engine is running or the transmission is in gear to ensure that the safety belt is not bypassed at some point after the initial check.

Returning now to FIG. 1, the safety belt bypass warning system also includes at least one, and possibly more, IR receiver(s) 132 positioned within the vehicle 100, for example, in one or more of the dashboard, binnacle, rearview mirror or its mount, the sun visor mountings, A pillar, B-pillar, C-pillar, headliner, center console, etc. and directed towards at least one seat 106 such that the coded IR signal from at least one IR emitter output 126 of an occupied seat 106 can be received. The IR receiver(s) 132 are each enabled when an IR emitter output 126 is enabled.

If a safety belt 116 for an occupied seat is properly in place, an IR receiver 132 should be able to receive the coded 130 IR light pulses 128 it outputs. If however, the occupant is bypassing the safety belt 116, by, for example, latching and then sitting on it, or latching it and moving the cross-torso portion behind them, the IR emitter output 126 will be obstructed and so its coded 130 IR light pulses 128 will not be received by any IR receiver 132.

When an IR receiver 132 is enabled and receives the coded 130 IR light pulses 128, the IR 132 receiver will convert an individual seat's coded 130 IR light pulses 128 to a coded electrical signal that is indicative of the seat 106 from which it received the coded 130 IR light pulses 128 and output 134 that coded electrical signal to the processor 112 for its use. Depending upon the particular implementation, the coded electrical signal can be a pattern that directly corresponds to the to the coded 130 IR light pulses or it can be some other coded electrical signal (for example, a binary number) or other pattern that is uniquely correlated to that seat, the important aspect being the ability to identify the particular seat, not the code or signal with which it is done.

When any IR receiver(s) 132 are enabled, the processor 112, executing a program retrieved from the storage 110, will identify all occupied seats 106 and their corresponding coded electrical signal and will compare the coded electrical signal it receives to the coded electrical signal it should receive for any occupied seat. If the processor receives a proper coded electrical signal for a seat within the time period(s), it means that seat has a non-bypassed safety belt and will flag/identify that seat 106 in the storage as such. If, however, within the time period(s), the coded electrical signal for any occupied seat is not received within a time period, the processor will trigger a safety belt bypass warning indicator to indicate that particular seat's safety belt has been bypassed.

In some cases, it is possible that an IR emitter output 126 may be blocked during the time period even though the safety belt has not been bypassed, for example, because it is being temporarily blocked by the occupant's arm or an article of clothing. Optionally, in some implementations, this can be avoided by, after the initial post-ignition check, having the processor 112 cause a re-enablement of the IR emitter output 126 for that seat some number of times and only trigger the safety belt bypass warning indicator if the failure to receive the coded electrical signal occurs with some regularity, or re-enablement of the IR emitter output 126 for that seat could occur upon occurrence of some event, for example, if the initial check was performed based upon ignition engagement, a re-check could occur after the transmission is placed into gear and, if additional checks are necessary, a further check could be performed upon the vehicle first reaching some nominal speed, for example, about 10 mph. Likewise, if the initial gear engagement is "reverse" then the check could also be re-performed when the transmission is next shifted into a forward gear. Alternatively, another option for implementations where an optical fiber within the safety belt is used, would employ two or three optical fibers and thereby have multiple IR emitter outputs 126 on a single safety belt (fed by a common IR emitter) and positioned such that, in proper use, at least one of the IR emitter outputs 126 will be exposed, but if bypassed, all of the IR emitter outputs 126 will be blocked.

Since different vehicles have different configurations, it should be recognized that different placement configurations for video cameras 102 and IR receivers 132 can be used.

FIG. 3 illustrates, in simplified form, an overhead view of a vehicle interior 300 showing one example placement for video camera(s) 102 and IR receiver(s) 132 as described herein. As shown, in FIG. 3, a video camera 102a near the headliner (not shown) above the dashboard 302 has a field of view 304a (between the dotted lines) encompassing the two front seats 306a, 306b and the center seat 306d in the rear. The video camera 102b near the headliner (not shown) above the center console 308, or in the center console 308, has a field of view 304b (between the dotted lines) encompassing all three back seats 306c, 306d, 306e.

There are also two IR receivers 132a, 132b on the dashboard 302, two IR receivers 132c, 132d in the back of the head restraints of the front seats 306a, 306b, and one in the center console 308, each directed at an individual corresponding seat such that each will receive coded IR light pulses from one safety belt's IR emitter output(s) 126.

FIG. 4 illustrates, in simplified form, an overhead view of a vehicle interior 400 showing another alternative example placement for video camera(s) 102 and IR receiver(s) 132 as described herein. As shown in FIG. 4, there are two video cameras 102c, 102d near the headliner (not shown) above the dashboard 402. Each video camera 102c, 102d has a field of view 404a, 404b (between the respective dotted lines) that respectively encompass two seats, a front seat 406a and back seat 406b on the passenger side and a front seat 406c and back seat 406d on the driver's side.

There are also two IR receivers 132f, 132g located, for the front of the vehicle, near the rear-view mirror (not shown), so that it can receive coded IR light pulses from the IR emitter output(s) 126 from the safety belts of the front seats, and for the rear of the vehicle, above the center console near a central interior light, so that it can receive coded IR light pulses from the IR emitter output(s) 126 of the safety belts of the two rear seats 406b, 406d.

FIGS. 5-6 collectively illustrate, in simplified form, one example of safety belt bypass warning indication.

As shown in FIG. 5, a vehicle's 500 occupant 502 is seated in a seat 106 behind the passenger seat of the vehicle 500, has retracted their safety belt from the retractor 504 and is wearing their safety belt 116 properly. The ignition has already been engaged and the IR emitter output 126 is outputting its coded 128 light pulses 130. Since the coded 128 light pulses 130 were received by an IR receiver (not shown) and the processor (not shown) matched the corresponding coded electrical signal it received, none of the dashboard warning indicators 506 for the individual seats of the vehicle 500 have been triggered.

In contrast, as shown in FIG. 6, the vehicle's 500 occupant 502 is now seated in the same seat 106 of the vehicle 500 but latched the safety belt before sitting so that the safety belt engagement sensor circuit 114 indicates that the occupant 502 is wearing their safety belt 116. As a result, although the IR emitter output 126 is outputting its coded 128 light pulses 130, since it is behind and blocked by the occupant 502, the corresponding IR receiver in the vehicle 500 cannot receive them. As a result, the processor (not shown) does not receive the coded electrical signal for this occupied seat, so it triggers a warning indication 600 on the corresponding dashboard warning indicators 506 to indicate that the safety belt for that particular seat has been bypassed.

Having described and illustrated the principles of this application by reference to one or more example embodiments, it should be apparent that the embodiment(s) may be modified in arrangement and detail without departing from the principles disclosed herein and that it is intended that the application be construed as including all such modifications and variations insofar as they come within the spirit and scope of the subject matter disclosed.

What is claimed is:

1. A vehicle safety belt bypass warning system for a vehicle having an ignition system and at least two seats within the vehicle, the vehicle safety belt bypass warning system comprising:
   I) a video camera having a field of view and wherein each of the at least two seats is within the field of view;
   II) at least one processor within the vehicle;
   III) face detection software, executable by the at least one processor, that will enable the processor to recognize, for each of the at least two seats, human faces;

IV) a dashboard warning indication unit within the vehicle having at least two safety belt bypass warning indicators each corresponding to one of the at least two seats;

V) wherein each of the seats has associated therewith
   a) a safety belt, extendable from a retracted position to a second position and retractable from the second position to the retracted position; and
   b) a safety belt engagement sensor circuit that detects when a safety belt latch plate of the safety belt, is received in and latched by a corresponding safety belt latch plate receiver, and a seat occupation sensor coupled to the seat that senses when at least a minimum weight is in the seat;

VI) wherein an individual seat of the at least two seats is an occupied seat when the seat occupation sensor senses at least the minimum weight, the safety belt engagement sensor circuit detects that the safety belt is latched, and the processor detects that a human face is present and associated with the individual seat;

VII) an infrared (IR) emitter, coupled to an IR emitter output positioned on the safety belt, that is enabled by the at least one processor multiple times after the ignition system has been engaged based upon at least one of
   a) a repetition schedule, or
   b) occurrence of some event while the engine is running and the vehicle is in gear, and
   if the seat is occupied, once enabled by the processor, will transmit individually coded light pulses, unique to the occupied seat, for a period of time;

VIII) at least one IR receiver within the vehicle, that is enabled when at least one IR emitter output is enabled and is positioned to receive individually coded light pulses from occupied seat IR emitters during the period of time and, in response to receipt, will output one or more coded electrical signals indicative of which of each occupied seat that the individually coded light pulses were received from; and IX) wherein the at least one processor is coupled to the at least one IR receiver, and will wait for receipt of one or more coded electrical signals output from the IR receiver during the time period, specifically indicating each seat that has a non-bypassed safety belt, and if the processor does not receive an indication for a particular occupied seat, the processor will trigger a safety belt bypass warning indicator of the dashboard warning indication unit to indicate that the particular occupied seat has a bypassed safety belt.

* * * * *